(12) United States Patent
Chang

(10) Patent No.: US 7,233,419 B2
(45) Date of Patent: Jun. 19, 2007

(54) SCANNER HAVING A SELF COLLECTION LIGHT SOURCE

(76) Inventor: Chin-Lin Chang, 3F, No. 3, Alley 37, Lane 152, Sec. 2, Chung-Hsing Rd., Chulung Chen, Hsinchu Hsien (TW)

( * ) Notice: Subject to any disclaimer, the term of this patent is extended or adjusted under 35 U.S.C. 154(b) by 751 days.

(21) Appl. No.: 10/065,354

(22) Filed: Oct. 8, 2002

(65) Prior Publication Data

US 2004/0066543 A1 Apr. 8, 2004

(51) Int. Cl.
*H04N 1/04* (2006.01)
(52) U.S. Cl. .................. 358/475; 358/484; 358/497
(58) Field of Classification Search ............ 358/475, 358/509, 484, 474, 497, 494; 382/312, 318, 382/319; 399/211, 212, 220, 221; 355/67–70; 359/34, 385; 250/227.11, 216, 234–236; 362/611–616, 624
See application file for complete search history.

(56) References Cited

U.S. PATENT DOCUMENTS

| | | | | |
|---|---|---|---|---|
| 4,371,897 A | * | 2/1983 | Kramer | 358/474 |
| 4,576,462 A | * | 3/1986 | Lehman | 399/52 |
| 4,627,824 A | * | 12/1986 | Hamai | 445/27 |
| 4,731,661 A | * | 3/1988 | Nagano | 358/509 |
| 4,908,717 A | * | 3/1990 | Natori | 358/474 |
| 5,416,608 A | * | 5/1995 | Ueda et al. | 358/474 |
| 6,360,030 B1 | * | 3/2002 | Kawai et al. | 382/312 |
| 6,646,769 B1 | * | 11/2003 | Fang | 358/509 |
| 6,917,452 B2 | * | 7/2005 | Beeman | 358/475 |
| 6,919,974 B1 | * | 7/2005 | Ichikawa et al. | 358/475 |

* cited by examiner

*Primary Examiner*—Cheukfan Lee
(74) *Attorney, Agent, or Firm*—Berkeley Law & Technology Group, LLP

(57) ABSTRACT

A scanner using a self-collection light source, is composed of a light source either with its tube walls coated with a layer of total reflective material, or a tube wall made to have a converging lens-like wall, so that the light source itself has built-in light converging ability. The original scattered light is first collected into a light beam before emitted to the scan line on the document. Thus, the light flux on the scan line can be substantially enhanced. Furthermore, by including the auxiliary light sources on both sides of this kind of main light source with self-collection capability, associating with a light intensity adjusting control circuitry, The light flux density on the two sides of the main light source is improved, so that it effectively improves the flux uniformity of light incident on the light detector.

21 Claims, 3 Drawing Sheets

SCANNER HAVING A SELF COLLECTION LIGHT SOURCE

BACKGROUND OF INVENTION

1. Field of Invention

This invention is related to a scanner. More particularly, this invention is related to a scanner having a self-collection light source.

2. Description of Related Art

Over recent years, with the great development in digital technology, and the phenomenal progress achieved in Internet and multi-media technologies, the image data is usually preferred to be converted into a digital format for subsequent processing. Therefore, we can take a direct shot at an object with a digital camera, and extract the image information from a document or picture with an optical scanner, then convert such information into digital image data. This allows the users to display the images on computers or other electronic products for document display, optical character recognition (OCR), editing, storing, and outputting.

According to the method of inputting document images, the optical scanners can be categorized into several types: palm style scanner, sheet feed scanner, drum scanner and flatbed scanner, and so on. For a flatbed scanner, the document or picture being scanned is placed on top of a transparent platform. The scanning process is performed by driving an optical scanning chassis, so as to scan step by step over the documents or pictures to have the complete image. Therefore, a flatbed scanner includes not only an optical scanning chassis, but also a transmission assembly for moving the optical scanning chassis to complete the scanning of a document or a picture.

Referring to FIG. 1A and FIG. 1B together, FIG. 1A is a schematic diagram showing the operation of a conventional flatbed scanner, and FIG. 1B shows its transmission assembly. In this flatbed scanner, a transparent platform 110 is disposed at the top, and a back-and-forth movable optical scanning chassis 120 is disposed under the transparent platform 110. The optical scanning chassis 120 includes a light source component 130, a light source fixture 140, multiple reflectors 160, a lens 150 and a light sensor 170. The transmission assembly 180 includes a stepper motor 185, a supporting housing 195, a gear set 190, a transmission belt (not shown), and so on.

As shown in FIG. 1A, the light source 130 emits light to document 115 sitting on the transparent platform 110. The light beam is first reflected from the surface of the document 115, then enters the interior of the optical scanning chassis 120, and sequentially undergoes reflection by the reflector 160 and refraction by the lens 150, eventually received by the light sensor 170 mounted inside the optical scanning chassis 120. The light is then converted into digital signal for output, and recorded as the digital image data.

Next, referring to FIG. 1B, in the transmission assembly 180, a stepper motor 185 is implemented on the supporting housing 195 to provide the driving power. The driving power supplied by the stepper motor 185 is transmitted via the gear set 190, so as to allow the optical scanning chassis 120 to scan along a pre-defined direction to perform the scanning process of a document.

The structure of a conventional light source unit 130 is shown in FIG. 2. It includes a tube 210 and the electrodes 220 on both ends thereof. The inside of the tube 210 is coated with a fluorescent material (not shown), and mercury vapor and certain noble gases are filled inside the tube 210. As a voltage is applied across the electrodes 220 sitting at both ends of the tube, accelerated electrons are produced in tube 210. The electrons bombard the mercury vapor and the noble gases in tube 210, and excite them to their excited states. These excited molecules can emit ultra-violet light as they return to the ground state. A visible light is then generated as the ultraviolet light bombards on the fluorescent material inside tube 210. However, this type of structure in light source 130 cannot meet the development requirements of high speed scanning with low exposure time due to its scattering nature of the light output.

SUMMARY OF INVENTION

In view of this light dispersion issue, the present invention provides a scanner with a self-collection light source. It collects the scattered light to be a light beam and then emits the light beam to a scanning line on the document, so as to effectively enhance the light flux density on the scan line.

In order to achieve the aforementioned and other objectives, this invention provides a scanner with a self-collection light source, suitable for document scanning. This scanner includes an optical scanning chassis and a transmission assembly. The optical scanning chassis has a self-collection light source, which can collect the scattered light into a beam before the light is emitted to the document to be scanned. The transmission assembly drives the optical scanning chassis to step-by-step accomplish the scanning operation on the document.

In one preferred embodiment of this invention, a total reflective material is coated at the interior wall surface or the outer wall surface of the light tube, but leaves an opening. Or, the interior wall of the light tube is arranged to form a converging lens-like tube wall, so that it can collect the scattered lights into a light beam before the scattered lights are emitted onto the document. In the case of coating the total reflective material on the tube, under considering that the light flux density decreases faster at the sides than that at the center, which may cause a non-uniform light flux density for the light detecting device. Thus, a layer of higher density of total reflective material should be applied on the outer or inner wall of the light source at the two ends of the tube. Also, a first and a second auxiliary light source (both with self-collection capability) can be added to the sides to compensate the light. When operating auxiliary light sources, a control circuit can be included to adjust the light intensity of the first and the second auxiliary light sources.

From the above descriptions, this invention provides a special optical light source scanner with self-collection ability, it can collect the scattering light into a light beam, then emits the light beam on the document line to be scanned, and therefore the light intensity on the scan line is greatly enhanced. Also, using the auxiliary light sources can further improve the uniformity of light flux received by the light-detecting device.

BRIEF DESCRIPTION OF DRAWINGS

This invention can be more fully understood by reading the following detailed description of the preferred embodiments, with reference made to the accompanying drawings, wherein.

DETAILED DESCRIPTION

Figure 2:
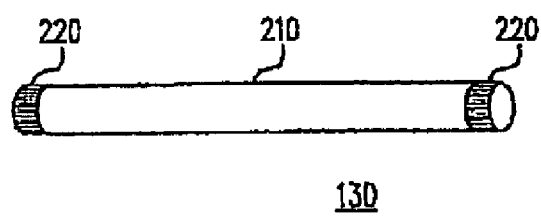
FIG. 2 is a schematic diagram showing the structure of a conventional light source unit.
Figure 3:
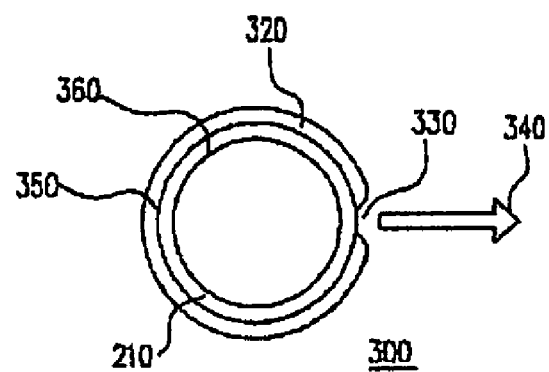
FIG. 3 is a cross sectional view of a light source based on one preferred embodiment of the present invention.

FIG. 3 shows the cross section of a light source based on one embodiment of this invention. As shown in FIG. 3, for the purpose of self-collecting scattering lights into a light beam and emitting the light beam onto the document, the light source 300, similar to FIG. 2, includes a tube 210, side electrodes 220 (not shown), the fluorescent material coated on the inner wall 360 (not shown), and mercury vapor and noble gas (not shown) sealed in tube 210. Also and, the outer wall 350 is further coated with a layer of total reflective material 320, leaving an opening 330 for emitting out the collected light beam 340. Naturally, It can be understood for the skilled artisans in this art that the total reflective material can also be implemented on the inner wall 360 of the tube.

When a voltage is applied across the two electrodes at the ends of the light source 300, accelerated electrons are generated inside the tube 210, bombards the molecules of the mercury vapor and noble gas in the tube 210 to excite them to the excited states. Then when the molecules at the excited states return to the ground state, an ultraviolet light is generated, which hits the fluorescent material on the inner wall 360 to emit visible light. The visible light is reflected by the total reflective material 320 coated on the tube 210, and the visible light is then collected into a higher flux light beam 340, which emits out through the opening 330 towards the document to be scanned (not shown) as shown in FIG. 3.

Figure 4:
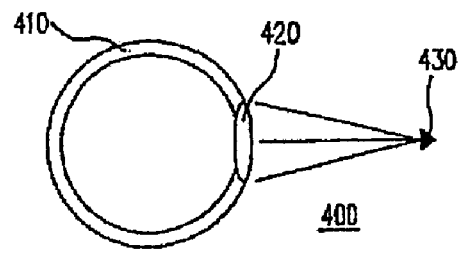
FIG. 4 is across sectional view of a light source based on another preferred embodiment of the present invention.

FIG. 4 is the cross sectional view of another preferred embodiment of a light source based on this invention. As shown in FIG. 4, the light source 400 takes a different approach from the one shown in FIG. 3. In order to have self-collection capability for collecting the scattering lights into a light beam and then emitting the light beam to the scanned document, the tube wall 410 of light source 400 is shaped to be converging lens like tube wall 420. As a result, the tube wall 410 can collect the scattering light into a beam 430 to emit it out.

Figure 1A:
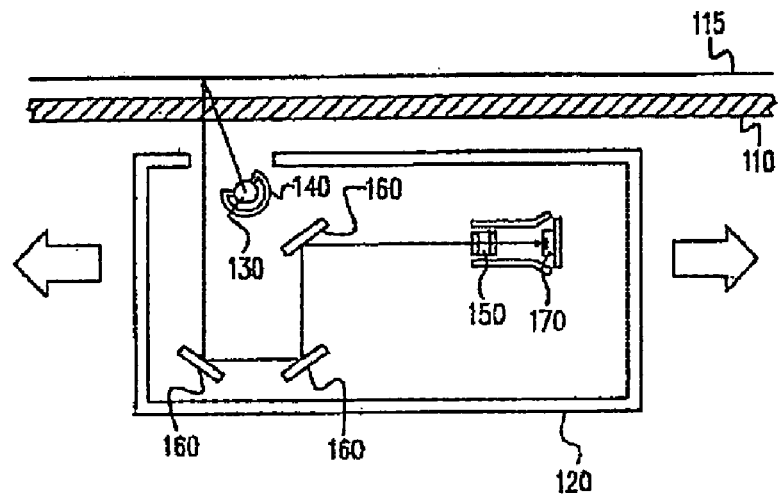
FIG. 1A is a schematic diagram showing the operation of a conventional flatbed scanner.
Figure 1B:
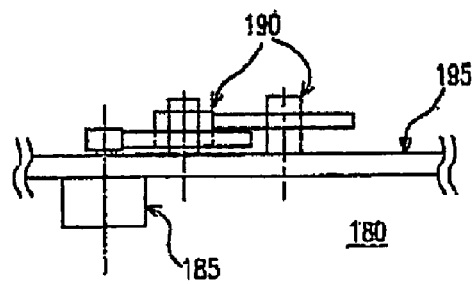
FIG. 1B is a schematic diagram showing a transmission assembly of a conventional flatbed scanner.
Figure 5:
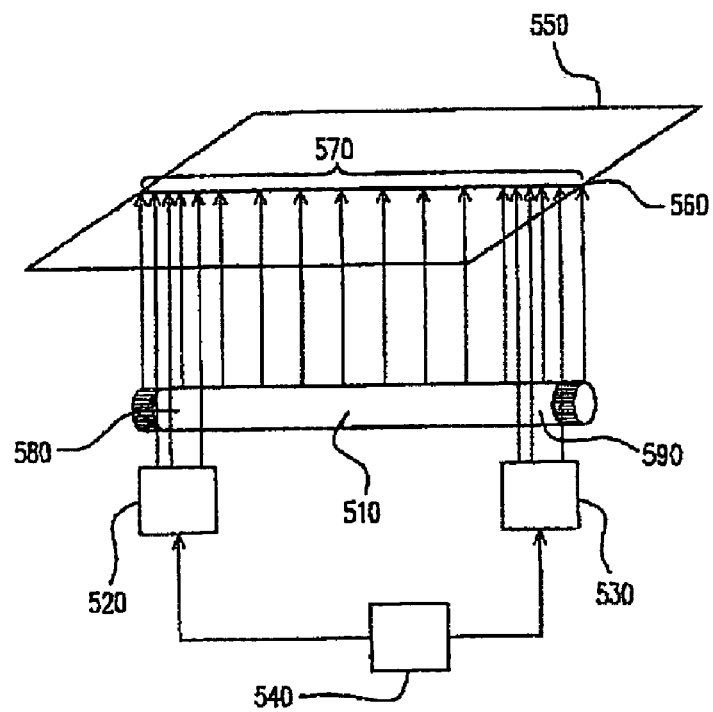
FIG. 5 is a schematic diagram showing the operation of a scanner when using the auxiliary light sources and the control circuitry based on one preferred embodiment of this invention.

FIG. 5 is a schematic diagram showing a scanner using the light source from one preferred embodiment of this invention. As shown in FIG. 5, light source 510 collects the scattering light into a light beam 570 before emitting it out, therefore, the light flux density on the scan line 560 in document 550 can be effectively enhanced. Moreover, while considering the phenomenon that the edges have a faster intensity decay than that at the center, resulting in flux non-uniformity in light intensity (as shown in FIG. 1A), a total reflective coating 510 is implemented with a layer of higher density total reflective material by, for example, coating, at the inner or outer walls of the light source 510 at the two sides (580 and 590) to increase the light intensity therein in advance. Further, a first and a second auxiliary light sources 520, 530 can also be arranged at the two sides of the light source to compensate. When the auxiliary light sources are used, a controlling circuitry 540 can be further included to adjust the light output intensity of the first and the second auxiliary light sources 520, 530.

In summary, this invention includes the following advantages:

1. Due to the built-in self-collection capability in the light source, which collects the scattered light into a light beam before emitting it on the scan line of the document, the light flux density on the scan line of document is greatly enhanced.

2. Because the light intensity on the edges of the light source can be adjusted and enhanced, the light flux uniformity on the light sensors is effectively improved.

It will be apparent to those skilled in the art that various modifications and variations can be made to the structure of the present invention without departing from the scope or spirit of the invention. In view of the foregoing, it is intended that the present invention covers modifications and variations of this invention provided they fall within the scope of the following claims and their equivalents.

The invention claimed is:

1. A scanner comprising:
   an optical scanning chassis having a light source, wherein the light source comprises:
   a primary light source comprising a tube having a first end and a second end, wherein the tube includes a tube wall applied with a total reflective material, such that an opening for emitting a light beam collected from scattered light is formed;
   a first and a second auxiliary light source, disposed proximate to the first and second end respectively of the primary light source; and
   a transmission assembly for supplying driving power to the optical scanning chassis.

2. The scanner of claim 1, wherein the total reflective material is coated on an outer wall of the tube of the primary light source.

3. The scanner of claim 1, wherein the total reflective material is coated on an inner wall of the tube of the primary light source.

4. The scanner of claim 1, wherein the first auxiliary light source and the second auxiliary light source each comprise a tube at least partially coated with total reflective material.

5. The scanner of claim 4, further comprising a controlling circuitry, adapted to adjust a light output intensity of the first and the second auxiliary light sources.

6. A scanner, comprising:
   an optical scanning chassis, having a light source, comprising:
   a primary light source comprising a tube having a tube wall, wherein the tube wall includes a converging lens wall portion, adapted to collect scattered light and emit a light beam;
   a first and a second auxiliary light source, disposed proximate to the first and second end respectively of the primary light source; and
   a transmission assembly for supplying driving power to the optical scanning chassis.

7. The scanner of claim 6, wherein the first auxiliary light source and the second auxiliary light source each comprise a tube having a converging lens wall portion.

8. The scanner of claim 7, further comprising a controlling circuitry, adapted to adjust a light output intensity of the first and the second auxiliary light sources.

9. A light source adapted for use in a scanner, the light source comprising:
   a primary light source comprising a tube having a tube wall, a first end, a second end, and a center portion, wherein the tube wall is applied with a total reflective material such that an opening for emitting a light beam is formed, wherein the total reflective material applied proximate to the first and second end comprises a total reflective material having a higher density than the material applied to the center portion of the tube wall; and a plurality of electrodes, disposed at both sides of the tube.

10. The light source of claim 9, wherein the total reflective material is applied to an outer side of the tube wall.

11. The light source of claim 9, wherein the total reflective material is applied to interior side of the tube wall.

12. A method of forming a light source for a scanner, comprising:

applying total reflective material on a tube wall of the light source, wherein the light source comprises a tube having a tube wall, a first end, a second end, and a center portion, wherein the total reflective material is applied to the tube wall such that an opening for emission of a light beam is formed, and wherein the total reflective material applied proximate to the first and second end comprises a total reflective material having a higher density than the material applied to the center portion of the tube wall; and disposing an electrode on each of said first and second ends.

13. The method of claim 12, wherein the total reflective material is applied to an outer side of the tube wall.

14. The method of claim 12, wherein the total reflective material is applied to interior side of the tube wall.

15. An apparatus, comprising:

an optical scanning chassis having a light source, wherein the light source comprises:

a primary light source comprising a tube having a first end and a second end, wherein the tube includes a tube wall applied with a reflective material, such that an opening for emitting a light beam collected from scattered light is formed; and a first and a second auxiliary light source, disposed proximate to the first and second end respectively of the primary light source.

16. The apparatus of claim 15, wherein the reflective material is coated on an outer wall of the tube of the primary light source.

17. The apparatus of claim 15, wherein the reflective material is coated on an inner wall of the tube of the primary light source.

18. The apparatus of claim 15, wherein the first auxiliary light source and the second auxiliary light source each comprise a tube at least partially coated with reflective material.

19. A scanner light source, comprising:

a primary light source comprising a tube having a first end and a second end, wherein the tube includes a tube wall applied with a total reflective material, such that an opening for emitting a light beam collected from scattered light is formed; and a first and a second auxiliary light source, each comprising a tube at least partially coated with reflective material, wherein the first and second auxiliary light sources are adapted to be disposed on the scanner proximate to the first and second end respectively of the primary light source.

20. The scanner light source of claim 19, wherein the total reflective material is coated on an outer wall of the tube of the primary light source.

21. The scanner light source of claim 19, wherein the total reflective material is coated on an inner wall of the tube of the primary light source.

* * * * *